United States Patent [19]

Brunner et al.

[11] Patent Number: 4,762,690
[45] Date of Patent: Aug. 9, 1988

[54] PROCESS FOR THE SEPARATION OF CATIONS FROM AQUEOUS SOLUTIONS

[76] Inventors: Herbert Brunner, Grunaustrasse 15, D-6450 Hanau 9; Reinhard Ballhorn, Darmstadterstrasse 72, D-6053 Obertshausen 2; Roland Schwab, Talblick 6, D-8502 Weiherhof, Fed. Rep. of Germany

[21] Appl. No.: 937,164

[22] Filed: Dec. 2, 1986

[30] Foreign Application Priority Data

Dec. 3, 1985 [DE] Fed. Rep. of Germany ....... 3542640

[51] Int. Cl.$^4$ .......................... A62D 3/00; G21F 9/12
[52] U.S. Cl. ........................................... 423/3; 423/6; 252/631; 376/313; 210/682
[58] Field of Search .................. 376/313; 423/2, 3, 6, 423/21.1, 21.5; 252/626, 631, 633; 210/682, 685

[56] References Cited

U.S. PATENT DOCUMENTS

| 4,514,367 | 4/1985 | Asami et al. | 423/21.5 |
| 4,560,759 | 12/1985 | Hiratani | 423/6 |
| 4,597,951 | 7/1986 | Gennaro et al. | 423/6 |
| 4,642,193 | 2/1987 | Miyata et al. | 210/682 |
| 4,657,731 | 4/1987 | Otte et al. | 376/313 |

Primary Examiner—Deborah L. Kyle
Assistant Examiner—Richard L. Klein
Attorney, Agent, or Firm—Cushman, Darby & Cushman

[57] ABSTRACT

Synthetic Crandallites of the general composition $MeAl_3(PO_4)(OH)_5 \cdot H_2O$ (Me=alkaline earth metal) are used for the separation of cations, especially alkaline earth metals, lanthanides and actinides, at a pH greater than 6 and temperature above 40° C.

14 Claims, No Drawings

PROCESS FOR THE SEPARATION OF CATIONS FROM AQUEOUS SOLUTIONS

BACKGROUND OF THE INVENTION

The invention is directed to a method for the separation of cations of the group of alkaline earth metals, lanthanides, actinides, ferrous metals, titanium, zirconium, hafnium, chromium, molybdenum, tungsten, vanadium, niobium, tantalum, aluminum and lead from aqueous solutions with the aid of a mineral compound.

Ion exchangers are used in nuclear technology to purify aqueous solutions containing fission products or other radionuclides which ion exchangers are normally conditioned and ultimately disposed of together with the radioactive charge. The ion exchangers used are either organic synthetic resins or inorganic, mineral compounds such as zeolites or other alkali aluminum silicates. These ion exchangers have the disadvantage that the radioactive charge can be given off again relatively easily, so that even ion exchangers enclosed in known conditioning agents such as cement or bitumen are not optimally resistant to being leached out when stored in an ultimate waste disposal site, especially in a salt dome.

Minerals of the crandallite group are widespread in nature. It was not until recently that they have attracted increasing interest because of their usefulness as fertilizers containing phosphate after they have been calcined. They also have attracted interest because of their complex geochemical behavior, which can result in an enrichment of rare earth elements which under certain favorable conditions leads to the formulation of ore deposits.

The phosphates of the crandallite group have the general formula $$MeAl_3.(PO_4)_2.(OH)_5.H_2O$$

(Me=alkaline earth metals or other bivalent and trivalent metals).

These phosphates occur as natural minerals in pure form solely as crandallite (Me=Ca$^{2+}$), goyazite (Me=Sr$^{2+}$) and gorceixite (Me=Ba$^{2+}$). Foreign ions are inserted by the partial substitution of Me$^{2+}$, Al$^{3+}$ and P$^{5+}$. Large (>1Å) divalent and trivalent cations such as, for example, Pb$^{2+}$, UO$^{2+}$, Ce$^{3+}$ and La$^{3+}$ substitute for Me$^{2+}$, smaller cations such as, for example, Fe$^{3+}$, Cr$^{3+}$ substitute for the Al$^{3+}$; and cations such as B$^{3+}$, S$^{6+}$, As$^{5+}$ and V$^{5+}$ substitute for the P$^{5+}$ in the phosphate. Some of the formal terminal members of these mixed phases have mineral names such as plumbogummite (Me=Pb$^{2+}$) or florencite (Me=Ce$^{3+}$); however, they have not been known previously in pure form either as natural or as synthetic products.

SUMMARY OF THE INVENTION

The invention is directed to a method for the separation of cations of the groups of alkaline earth metals e.g. Ca, Ba, Sr, lanthanides e.g., Ce, Pr, Nd, Pm, Sm, Dy, Er, Yb, Lu, actinides, e.g., Th, Pa, U, Np, Pu, ferrous metals, titanium, zirconium, hafnium, chromium, molybdenum, tungsten, vanadium, niobium, tantalum, aluminum and lead from aqueous solutions with the aid of a mineral compound in which, after appropriate conditioning, the cations are bound so firmly into the mineral compound that they can not be washed out by salt solutions even after a long time.

The invention solved the problem by using a crandallite of the general composition $$MeAl_3.(PO_4)_2.(OH)_5.H_2O$$

(Me=alkaline earth metal, e.g. Ba, Sr, Ca) as mineral compound at a pH above 6 and temperature above 40° C.

It is preferable during the separation of cations if the pH is between 8 and 11 and the temperature between 50° and 70° C.

It is advantageous to use synthetic crandallites which were produced by the conversion of alkaline earth metal hydroxides, e.g., calcium hydroxide, barium hydroxide or strontium hydroxide or of alkaline earth salts capable of reacting to form hydroxides in aqueous solutions (e.g. calcium chloride, calcium nitrate) and of aluminum hydroxide or of aluminum salts capable of forming hydroxides with phosphoric acid in the appropriate stoichioimetric ratios in aqueous solution at pHs between 6 and 12 and temperatures between 40° and 80° C. It is preferable to start with freshly precipitated aluminum hydroxide and work with a pH between 8 and 11.

There have also been found useful synthetic crandallites which are produced by the conversion of alkaline earth hydroxides or of alkaline earth salts capable of reacting to form hydroxides and of aluminum hydroxide with phosphoric acid in the appropriate stoichiometric ratios under pressure at a pH of 6 to 12 and a temperature between 180° and 220° C. It is preferable hereby to use crystalline bayerite as aluminum hydroxide and to perform the hydrothermal synthesis at pH=7.

It is possible with these synthetic crandallites to bind a variety of cations occurring in radioactive liquid wastes, such as, for example, Ca$^{2+}$, Sr$^{2+}$, Ba$^{2+}$, Pb$^{2+}$, Al$^{3+}$, Ce$^{3+}$, La$^{3+}$, Fe$^{3+}$, Cr$^{3+}$, Th$^{4+}$, Zr$^{4+}$ and others of the classes set forth above in a form which is very difficult to dissolve and to bring them to an ultimate waste disposal site.

The separation of cations from aqueous solution is advantageously performed by adding freshly produced crandallite into the aqueous solution containing the cations to be separated. 1.5 to 6 g crandallite per gram of cations to be separated are added into the solution. In order to separate traces of the named cations, an excess of crandallite is used.

The production of synthetic crandallites and the separation of cations with the aid of these crandallites will be explained in more detail in the following example:

The process can comprise, consist essentially of or consist of the stated steps with the recited materials.

DETAILED DESCRIPTION

EXAMPLE 1

30 mmoles freshly precipitated aluminum hydroxide were mixed into an aqueous solution of strontium nitrate (7.5 mmoles strontium), then compounded with 20 mmoles phosphoric acid and neutralized under agitation with calcium hydroxide. The suspension produced was then agitated 24 hours at 60° C. According to the reaction equation 3 Al(OH)$_3$+Sr(OH)$_2$+2H$_3$PO$_4$→SrAl$_3$(PO$_4$).(OH)$_3$.H$_2$O+5H$_2$O, a very finely crystalline crandallite is obtained which partially still exhibits amorphous phases.

EXAMPLE 2

An autoclave was loaded with 3.6 mmoles phosphoric acid, 1 mmole water, 5.3 mmoles aluminum hydroxide in the form of bayerite as well as 1.8 mmoles barium hydroxide and tightly sealed. After a reaction time of 1.5 months at 200° C., filtration was carried out, the residue washed with water and dried at 120° C. The crandallite produced in this manner is crystalline, exhibits the composition $BaAl_3(PO_4)_2.(OH)_5 . H_2O$ and does not dissolve in hydrochloric acid.

EXAMPLE 3

4.2 g crandallite produced according to example 1 was added to 4 liters of a solution containing 300 g/l sodium nitrate, 0.19 g/l strontium nitrate, 0.6 g/l europium nitrate and 0.6 g/l thorium nitrate at pH 8 to 11 and the suspension was heated 14 days at 60° C. After filtration was carried out, the solution was analyzed and it was determined that the strontium content had degraded by more than 75%, the europium content by more than 99% and the thorium content likewise by more than 99%.

The charged crandallite was leached in a Soxlet apparatus 24 hours at 100° C. with deonized water.

A dissociation of strontium from the crandallite of 0.06 to 0.08%, with reference to the total strontium content, resulted.

These charged crandallites are very suitable for ultimate waste disposal after an appropriate conditioning.

The entire disclosure of German priority application No. P3542640.3 is hereby incorporated by reference.

What is claimed is:

1. A process for separating a cation selected from the group consisting of alkaline earth metals, lanthanides, actinides, ferrous metals, titanium, zirconium, hafnium, chromium, molybdenum, tungsten, vanadium, niobium tantalum, aluminum and lead from an aqueous solution comprising employing Crandallite of the general formula $MeAl_3(PO_4)_2(OH)_5.H_2O$ where Me is an alkaline earth metal, at a pH above 6 and a temperature above 40° C.

2. The process according to claim 1 where the pH is between 8 and 11.

3. The process according to claim 3 where the temperature is between 50° and 70° C.

4. The process according to claim 1 wherein there is employed synthetic Crandallite that is produced by reaction of an alkaline earth hydroxide or an alkaline earth salt which forms an alkaline earth hydroxide in aqueous solution and aluminum hydroxide or an aluminum salt which forms aluminum hydroxide with phosphoric acid in aqueous solution wherein there are employed the stoichiometric molar ratios required to form Crandallite at a pH between 6 and 12 and temperature between 40° and 80° C.

5. The process according to claim 2 wherein there is employed synthetic Crandallite that is produced by reaction of an alkaline earth hydroxide or an alkaline earth salt which forms an alkaline earth hydroxide in aqueous solution and aluminum hydroxide or an aluminum salt which forms aluminum hydroxide with phosphoric acid in a queous solution wherein there are employed the stoichiometric molar ratios required to form Crandallite at a pH between 6 and 12 and temperature between 40° and 80° C.

6. The process according to claim 3 wherein there is employed synthetic crandallite that is produced by reaction of an alkaline earth hydroxide or an alkaline earth salt which forms an alkaline earth hydroxide in aqueous solution and aluminum hydroxide or an aluminum salt which forms aluminum hydroxide with phosphoric acid in aqueous solution wherein there are employed the stoichiometric molar ratios required to form Crandallite at a pH between 6 and 12 and temperature between 40° and 80° C.

7. The process according to claim 4 wherein the synthetic Crandallite is produced from freshly precipitated aluminum hydroxide at a pH between 8 and 11.

8. The process according to claim 5 wherein the synthetic Crandallite is produced from freshly precipitated aluminum hydroxide at a pH between 8 and 11.

9. The process according to claim 6 wherein the synthetic Crandallite is produced from freshly precipitated aluminum hydroxide at a pH between 8 and 11.

10. The process according to claim 1 wherein there is employed synthetic Crandallite produced by reaction of an alkaline earth hydroxide or an alkaline earth salt which forms an alkaline earth hydroxide in aqueous solution and aluminum hydroxide or an aluminum salt which forms aluminum hydroxide with phosphoric acid in aqueous solution wherein there are employed the stoichiometric molar ratios required to form Crandallite at a pH between 6 and 12 and Temperatures between 180° and 220° C. under pressure.

11. The process according to claim 2 wherein there is employed synthetic Crandallite that is produced by reaction of an alkaline earth hydroxide or an alkaline earth salt which forms an alkaline earth hydroxide in aqueous solution and aluminum hydroxide or an aluminum salt which forms aluminum hydroxide with phosphoric acid in aqueous solution wherein there are employed the stoichiometric molar ratios required to form Crandallite at a pH between 6 and 12 and Temperatures between 180° and 220° C. under pressure.

12. The process according to claim 3 wherein there is employed synthetic Crandallite that is produced by reaction of an alkaline earth hydroxide or an alkaline earth salt which forms an alkaline earth hydroxide in aqueous solution and aluminum hydroxide or an aluminum salt which forms aluminum hydroxide with phosphoric acid in aqueous solution wherein there are employed the stoichiometric molar ratios required to form Crandallite at a pH between 6 and 12 and Temperatures between 180° and 220° C. under pressure.

13. The process according to claim 1 wherein the synthetic Crandallite employed is produced from aluminum hydroxide in the form of Bayerite.

14. The process according to claim 10 wherein the synthetic Crandallite employed is produced from aluminum hydroxide in the form of Bayerite.

* * * * *